United States Patent Office 3,448,283
Patented June 3, 1969

3,448,283
RADIATION PYROMETER SYSTEM SUBSTANTIALLY INDEPENDENT OF AMBIENT TEMPERATURE CHANGES
Joseph B. Higley, Philadelphia, Donald Robertson, Ambler, and Franklin K. Schroyer, Oreland, Pa., assignors to Leeds & Northrup Company, Philadelphia, Pa., a corporation of Pennsylvania
Filed Apr. 28, 1965, Ser. No. 451,539
Int. Cl. G01j *3/50;* H01j *39/00*
U.S. Cl. 250—226    5 Claims

ABSTRACT OF THE DISCLOSURE

A radiation pyrometer device utilizing a silicon photovoltaic light sensitive element having an output whose magnitude changes with changes in temperature of a hot body under measurement and also with changes in ambient temperature, together with a narrow band-width filter which not only restricts the response of the radiation pyrometer to a narrow spectral passband, but also renders the pyrometer insensitive to changes in ambient temperature.

---

This invention relates to radiation pyrometers of the spectrally limited type and has for an object the provision of an improved spectrally limited radiation pyrometer system which is substantially independent of ambient temperature changes.

The majority of radiation pyrometers for industrial use are of the total radiation type and utilize thermopiles as the radiant energy detectors. An example of such a thermopile is shown in United States Reissue Patent Re. 23,615. However, for applications where it is desired to make temperature measurements of metals in cooler surroundings which are not under blackbody conditions, temperature measurements which are closer to the true temperature can be obtained with a spectrally limited radiation pyrometer than those obtained with a total radiation pyrometer. This may be accomplished in accordance with the present invention by selecting a narrow spectral response band at approximately 0.65 micron which is about the same response band as an optical pyrometer.

The higher accuracy results from higher spectral emittance of most metallic surfaces at short wavelengths and a greater rate of change of radiated energy with change in temperature at the short wavelengths. The higher spectral emittance makes the narrow band pyrometer less susceptible to changes in target environment than broad band pyrometers while the greater rate of change of radiated energy with change in temperature results in an output proportional to approximately $T^{12}$ rather than $T^4$ as obtained with a total radiation pyrometer. Thus, while the millivolt output of the spectrally limited pyrometer varies directly with changes in target emittance, the corresponding apparent temperature does not, and errors due to change in target emittance are reduced by a factor of three (ratio of exponents) over the total radiation pyrometer.

The present invention is particularly directed to radiation pyrometers which utilize as the detector or sensing element a silicon photovoltaic light sensor in combination with an infrared absorbing means. Silicon cells are sometimes referred to as silicon photodiodes and are solid state detectors which generate an electric current when illuminated with visible light or infrared radiation without the aid of an external voltage source. Photovoltaic devices have several advantages including ruggedness, great sensitivity, high speed of response and the fact that they respond only to radiation of certain wavelengths. Silicon photovoltaic cells respond to radiation of wavelengths from about 0.50 micron to about 1.2 microns whereas a thermopile responds to radiation of all wavelengths.

The use of silicon photovoltaic cells per se in radiation pyrometry has been discussed by R. Barber and T. Land in a chapter entitled "The Place of Photovoltaic Detectors in Industrial Pyrometry" appearing in "Temperature, Its Measurement and Control in Science and Industry," volume III, pp. 391–403, published by Reinhold Publishing Corporation in 1962. That publication points out that with ambient temperature as they have positive temperature coefficients of current output. Such publication points out that temperature compensation for a silicon cell is obtained with a compensating network comprising a shunt circuit combining thermistors and manganin resistors. However, the publication also points out that it is not possible to provide perfect compensation for all temperatures of the measured hot body as the cause of the variation in output is a shift in the cutoff wavelength, not a change in sensitivity of the cell.

In accordance with the present invention, there is provided a radiation pyrometer system which is not only limited spectrally to a particular band of wavelengths but by doing so, the output of the sensing element is rendered substantially independent of ambient temperature changes. In accordance with one aspect of the invention, ther is provided in a radiation pyrometer system for measuring the temperature of hot bodies with a radiant energy sensor having an output which changes in magnitude both with change in temperature of the hot body measured and with change in ambient temperature, the method of making the system insensitive to ambient temperature changes comprising the step of limiting the spectral distribution of the radiant energy received by the sensor to wavelengths up to about the wavelength of maximum response of the sensor at room temperature.

In accordance with another aspect of the invention, there is provided in combination, a radiant energy sensing element having an output which changes in magnitude with change in ambient temperature as a result of a change in the wavelength cutoff of the sensing element with change in ambient temperature, and filtering means having a substantially zero ambient temperature, coefficient. The filtering means has the characteristic of cutting off radiant energy to the sensing element in the spectral region where change in the wavelength cutoff of the sensing element takes place whereby the output of the sensing element in the combination is rendered substantially independent of ambient temperature changes.

In accordance with a further aspect of the invention, there is provided a radiation pyrometer system for measuring the temperature of hot bodies at temperatures above a practical minimum of about 2000° F. Such system comprises a silicon photovoltaic light sensor responsive to radiant energy of wavelengths up to about 1.2 microns and disposed to receive radiant energy from the hot body. The sensor has the characteristic of having its output change with changes in ambient temperature. Such system also includes a filter supported in the optical path between the hot body and the silicon photovoltaic light sensor. The filter has the characteristic of high transmission of radiant energy up to about 0.55 micron with substantially zero transmission at about 0.95 micron. The filter has a substantially zero ambient temperature coefficient (i.e., there is no change in the radiant energy transmission characteristics of the filter with change in ambient temperature) and has the characteristic of making the output from the silicon photovoltaic light sensor substantially independent of changes in ambient temperature up to about 200° F.

For further objects and advantages of the invention and for a more detailed understanding thereof, reference is to be had to the following description taken in conjunction with the accompanying drawings, in which.

Figure 1:
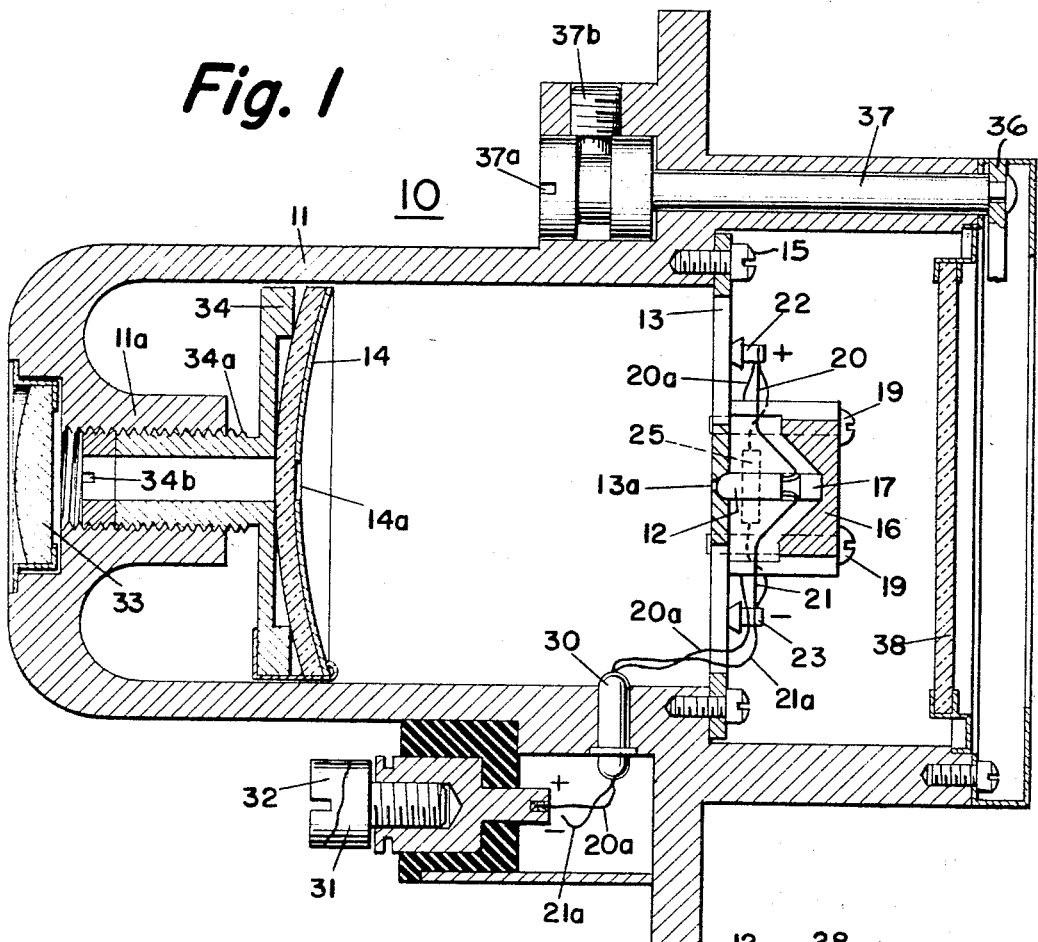
FIG. 1 is a vertical sectional view of a radiation pyrometer embodying the present invention.

Referring to FIG. 1, there is illustrated a radiation pyrometer 10 having a housing 11 within which there is adapted to be supported a sensing element 12 of the solid state type. In a preferred form of the invention, the sensing element 12 comprised a silicon photovoltaic light sensor or cell of the P–N junction type and sensitive to the visible and near infrared radiant energy. Sensors or cells of this type are well known in the art, an example being a P–N junction photosensor L–4412 manufactured by Philco. A representative relative response curve at room temperature for such silicon photovoltaic light sensor is shown by curve S in FIG. 3. It will be noted from curve S in FIG. 3 that the silicon sensor responds to radiant energy of wavelengths up to about 1.2 microns from about 0.50 micron and that the silicon sensor has a maximum response at about 0.95 micron at room temperature.

Figure 2:
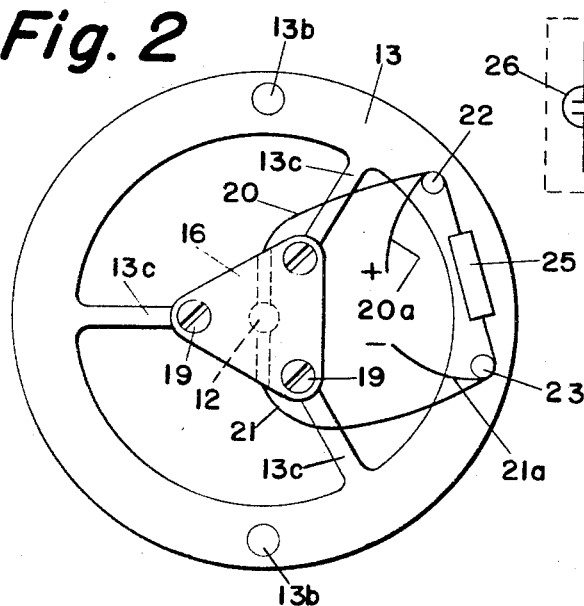
FIG. 2 is a plan view of the diaphragm support for the photovoltaic cell of FIG. 1.
Figure 2A:
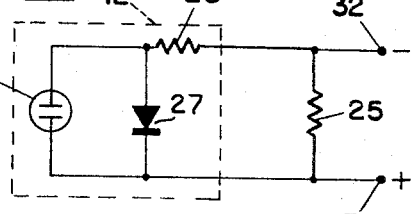
FIG. 2A is a schematic showing of the equivalent circuit of the photovoltaic cell and the load resistance of FIGS. 1 and 2.

As may be seen in FIGS. 1 and 2, the sensor 12 is adapted to be supported within the housing 11 by means of a diaphragm 13 having a small aperture 13a at the center thereof through which the sensor 12 is adapted to receive radiant energy reflected from the hot body source by a spherical narrow angle mirror 14, FIG. 1. The diaphragm 13 is provided near its outer periphery with a pair of holes 13b, FIG. 2, through which screws 15, FIG. 1, are adapted to extend to mount the diaphragm 13 within the housing 11. The sensor 12 is held in alignment with the opening 13a in the diaphragm 13 by means of a retainer 16 and rubber insulating bumper 17, the retainer 16 being adapted to be secured to the three radial supporting members 13c of the diaphragm 13 by screws 19. The sensor 12 is provided with a pair of leads 20 and 21 which are connected to a pair of terminals 22 and 23 mounted on the rim of the diaphragm 13. A load resistor 25 is also connected across the terminals 22 and 23. The equivalent circuit of a silicon photovoltaic light sensor is illustrated in FIG. 2A. Such circuit includes a current generator 26 representing that photons release electrons. The light generated current is proportional to intensity of illumination of the silicon sensor. The current generator 26 is shunted by a diode 27 and there is a series resistance 28 representing the internal resistance of a silicon cell. Thus, the elements 26–28 in FIG. 2A represent the equivalent circuit of the silicon photovoltaic light sensor 12 illustrated in FIGS. 1 and 2. The load resistor 25 shown in FIG. 2 is also illustrated in schematic form in FIG. 2A and has a typical value of about 10,000 ohms.

As may be seen in FIGS. 1 and 2, the leadwires 20 and 21 have leadwire extensions 20a and 21a which extend through insulator 30 in the side wall of housing 11 and which are connected to electrical contact posts 31 and 32 at the exterior of the pyrometer housing 11 for connection to a temperature measuring circuit of suitable known type.

Referring to FIG. 1, it will be seen that the mirror 14 has not been metallized at its central portion and, thus, provides a transparent opening 14a through which there may be viewed, by means of an eye piece 33, the image of the hot body under measurement produced on the back surface of the diaphragm 13. By viewing the image of the hot body through the eye piece 33, the radiation pyrometer 10 may readily be aligned so as to position the image of the hot body centrally on the diaphragm opening 13a. The mounting for the mirror 14 is similar to that disclosed in United States Patent No. 2,813,203. The mirror 14 is supported by a holder 34 having a threaded end 34a which engages the internally threaded portion 11a of the housing 11. The holder 34 is adjustable for movement of the mirror 14 along the optical axis of the pyrometer 10 to permit adjustment of the focus of the pyrometer. A locking nut 34b is adapted to lock the holder 34 in fixed position after adjustment of focus. The forward end of the housing 11 is provided with a light trimmer in the form of a pivoted shutter 36 carried by a pivot post 37. The post 37 is provided with an adjusting slot 37a so that the shutter 36 is adjustable to control the amount of light striking the window 38. Silicon cells of identical construction may vary one from the other as to output under the same light conditions. The adjustable light trimmer 36 permits the outputs of the silicon cells having greater outputs to be reduced to correspond to the ones which have a lower output thereby providing uniformity of output between units.

Figure 3:
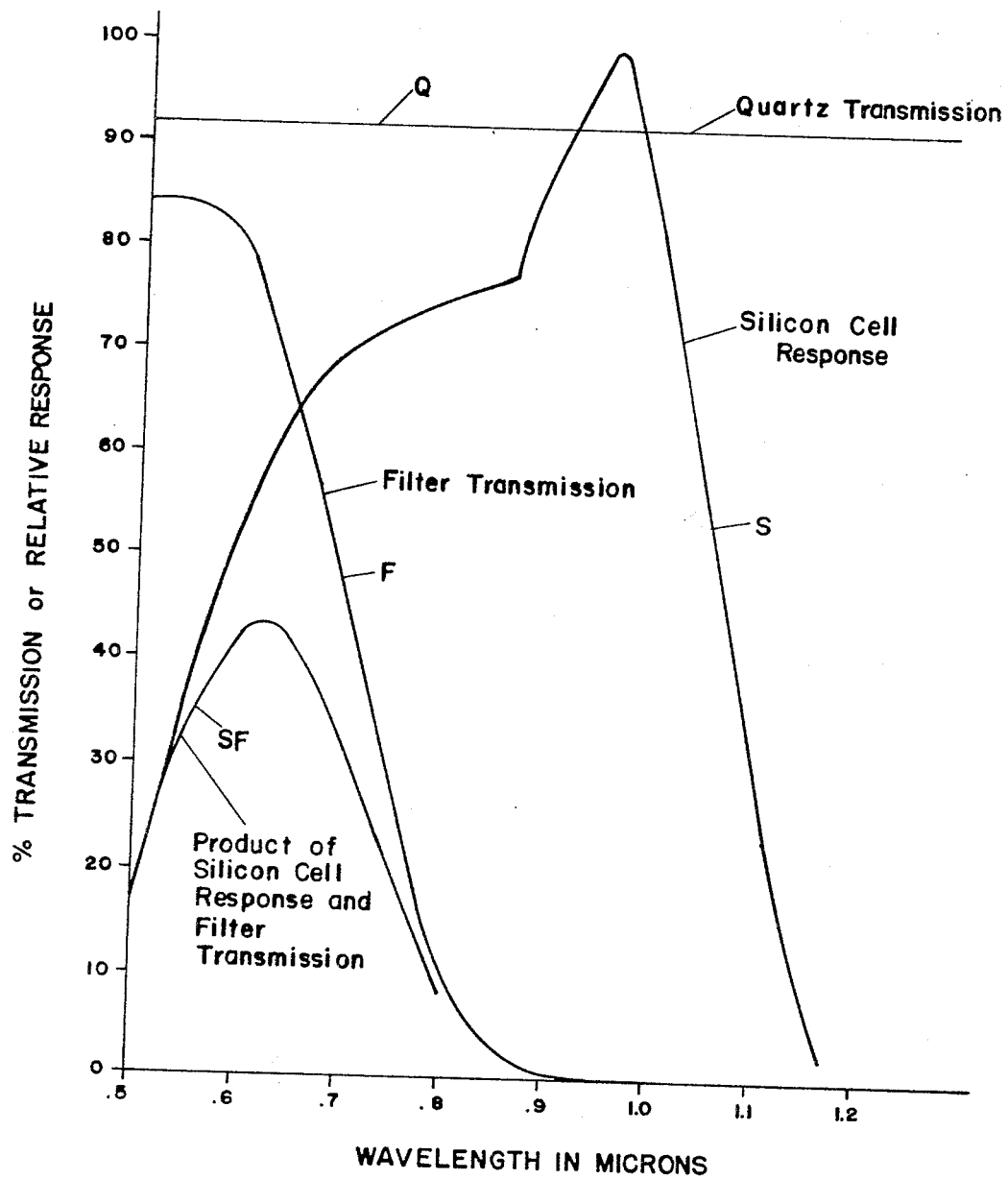
FIGS. 3 and 4 are graphs showing curves useful in explaining certain aspects of the invention.

The window 38 of FIG. 1 functions as a low-pass optical filter and its spectral transmission characteristics are illustrated by curve F in FIG. 3. The window or filter 38 is of material, examples of which are given hereinafter, having a zero ambient temperature coefficient, i.e., there is no change in the radiant energy transmission characteristics of the filter with change in ambient temperature. From curve F, it will be seen that the filter 38 has a high transmission of incident visible radiant energy up to about 0.55 micron where it begins to fall rapidly toward zero decreasing to the 50 percent transmission point at about 0.69 micron and reaching the zero transmission point at about 0.95 micron. The combination of the front window spectral transmission and the silicon cell response is illustrated by the curve SF in FIG. 3 which is a product of the silicon cell response curve S and filter transmission curve F. Such combinatioin provides a passband centered around an effective wavelength of approximately 0.65 micron. In FIG. 3, it will also be seen that the transmission curve Q for quartz, Pyrex, or other similar materials is substantially a straight line at about 92 percent transmission as these transmit freely at all wavelengths shown in FIG. 3. Thus, if the front window 38 were made of quartz, it will be noted that the passband of the pyrometer system would be that of the silicon cell alone rather than the narrow passband illustrated by the curve SF.

As pointed out above, where silicon cells have been used in radiation pyrometers with quartz windows, the output from the silicon cell will deviate substantially due to change in ambient temperature. For practical use, it is considered that the output of a radiation pyrometer should not change more than about three percent while it is sighted on a 0.4 emissivity target at 3000° F. and the ambient temperature (its housing temperature) is elevated 100° F. from room temperature. This three percent in output amounts to a change in temperature indication of about 9° F. In practice, the temperature scales on recorders for radiation pyrometers are approximately exponential, taking into account the product of Planck's Spectral Distribution Law and the passband, and because of this exponential quality, the scale is much more open at the higher ranges. The lower temperature target outputs are a very small percentage of the full scale output. For example, in one application, the outputs at 2200° F. and 2000° F. were about ten percent and 2.5 percent, respectively, of the output at 2700° F. It should be noted that blackbody temperatures of 2000° F., 2200° F. and 2700° F. are equivalent to 0.4 emissivity target temperatures of about 2180° F., 2400° F. and 2932° F. for a radiation pyrometer such as the pyrometer 10 illustrated in the present application.

Figure 4:
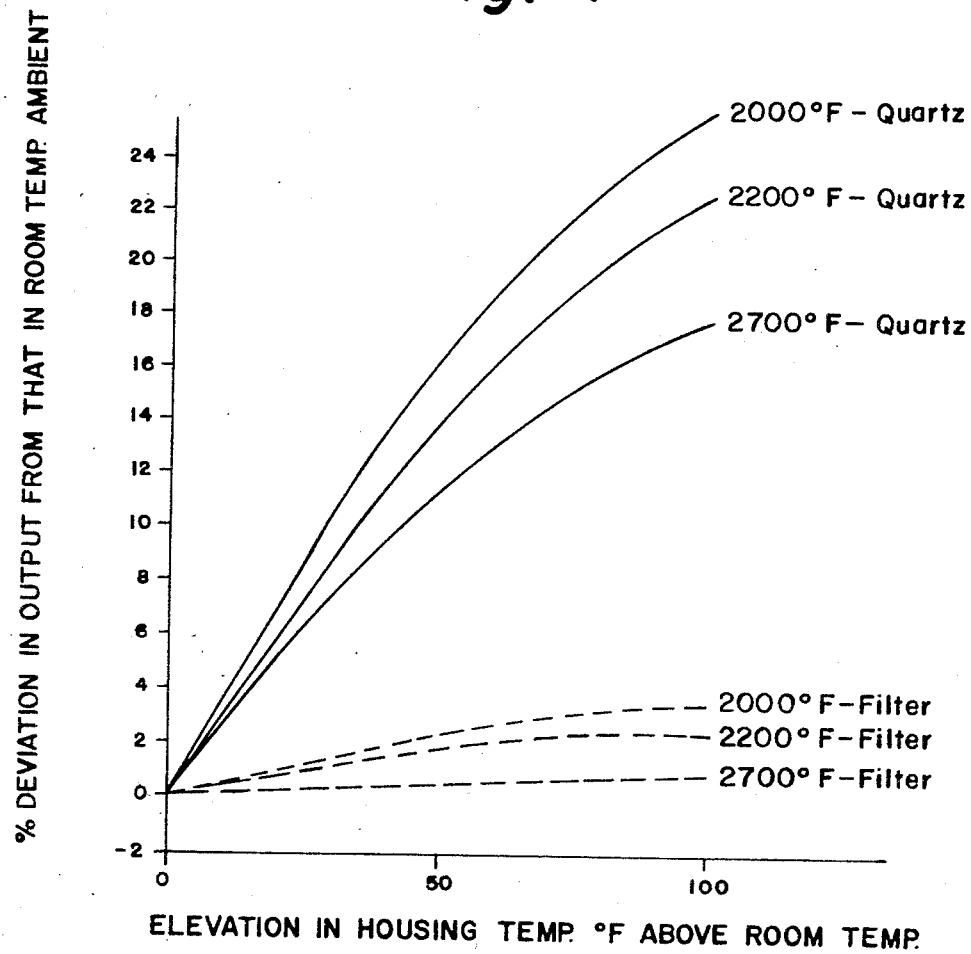

Referring to FIG. 4, the three solid line curves illustrate the deviations in output with an elevation in ambient temperature above room temperature up to 100° F. for three representative blackbody target temperatures, 2000° F., 2200° F. and 2700° F., for the pyrometer 10 with a quartz front window. It will be noted that the quartz front window leaves the pyrometer grossly under-compensated, the coefficient of the deviation being positive with temperature elevation, and would require the addition of a temperature compensating network which, in standard practice, consists of a parallel combination of a thermistor and a resistor in series. It will also be noted that the percent of deviation differs for different target temperatures. The resistor 25, FIG. 2A, performs no compensation function but merely furnishes an impedance match.

When the pyrometer 10 was provided with a front window filter having a transmission characteristic as illustrated by the curve F in FIG. 3, it was found that the deviations in output of the pyrometer with an elevation in ambient temperature decreased markedly. This is illustrated by the three broken line curves in FIG. 4 where it will be seen that the output from the radiation pyrometer has been made substantially independent of changes in ambient temperature up to about 100° F. above room temperature and over a blackbody temperature range of from about 2000° F. to about 2750° F. Thus, it will be seen that the filter 38 performs the dual function of providing the radiation pyrometer 10 with a spectral passband so that its "effective wavelength" is approximately 0.65 micron and also makes the output of the pyrometer substantially independent of ambient temperature changes.

Several infrared absorbing filters are available commercially having a zero ambient temperature coefficient and a transmission characteristic as illustrated by the curve F in FIG. 3. For example, in one application the front window 38 was made from heat absorbing glass No. 2043 manufactured by Pittsburgh Plate Glass Company. The filter was approximately 3/32 inch thick. Another suitable infrared absorbing filter is the glass color filter manufactured by Corning Glass Works and identified as C.S. 1-69, filter 4600.

While the front window 38 has been described herein as being constructed of the filter material, it is to be understood that such filter for the system may be located at other places in the pyrometer 10 and still be within the scope of the invention. For example, the front window of the pyrometer may be made of quartz or other material having a broad spectral transmittance and the filter placed in the small opening 13a in front of the silicon cell 12 or anywhere in the optical path leading to the silicon cell. A lens of the filter material may be used in the optical system, if desired. Additionally, the mirror 14 may be of the rear surfaced type and made of the filter glass or the system may include a secondary mirror of similar construction for directing the desired narrow passband radiant energy to the sensor or cell 12.

As to the theory of why the infrared absorbing filter in addition to providing the radiation pyrometer with a spectral passband also provides ambient temperature compensation for the pyrometer, it is believed that when a silicon cell is heated as by rise in ambient temperature, the wavelength cutoff of the spectral sensitivity curve is displaced towards longer wavelengths so that the light generated current is increased. However, by limiting the spectral distribution of the radiant energy received by the silicon cell to wavelengths up to about the wavelength of maximum response of the silicon cell at room temperature, such displacement or shift will have substantially no effect on the output of the cell with change in ambient temperature thereby eliminating the need for the conventional temperature compensating circuits heretofore thought necessary to provide temperature compensation for silicon cells.

Other types of filters having a zero ambient temperature coefficient may be utilized for spectrally limiting the radiation pyrometer in accordance with this invention. For example, by applying a long wave cutoff interference filter transmitting radiant energy up to about 0.7 micron for low temperature service where little or no energy shorter than the red band exists, and a combination of this filter and a pyrometer red filter which transmits radiant energy from about 0.6 micron and above for high temperatures, the pyrometer can be made to respond to a band approximating that of the optical pyrometer having an effective wavelength centered between about 0.6 and 0.7 micron. It is understood, of course, that the radiant energy transmission characteristics of such filters should not change with change in ambient temperature. In other words, the filters should have a substantially zero ambient temperature coefficient as described herein.

It is to be understood that the present invention is not limited to the specific arrangements described and illustrated herein but further modifications thereof may be made within the scope of the appended claims.

What is claimed is:

1. In combination, a radiant energy sensing element having an output which changes in magnitude with change in ambient temperature as a result of a change in the wavelength cutoff of said sensing element with change in ambient temperature, and filtering means having a substantially zero ambient temperature coefficient, said filtering means having the characteristic of limiting the spectral distribution of the radiant energy received by said sensing element to wavelengths up to about the wavelength of maximum response of said sensing element at its normal operating temperature thereby cutting off radiant energy to said sensing element in the spectral region where change in the wavelength cutoff of said sensing element takes place due to an increase in the operating temperature of said sensing element with an increase in its ambient temperature so that the output of said sensing element in said combination is rendered substantially independent of ambient temperature changes.

2. A radiation pyrometer for measuring the temperature of hot bodies comprising:

a silicon photovoltaic light sensor responsive to radiant energy of wavelengths up to about 1.2 microns and disposed to receive radiant energy from the hot body, said sensor having an output which changes with changes in ambient temperature, and a filter supported in the optical path between the hot body and said silicon photovoltaic light sensor, said filter having the characteristic of high transmission of radiant energy up to about 0.55 micron with substantially zero transmission at about 0.95 micron, said filter having a substantially zero ambient temperature coefficient and having the characteristic of making the output from said silicon photovoltaic light sensor substantially independent of changes in ambient temperature up to about 100° F. above ambient.

3. A radiation pyrometer system for measuring the temperature of hot bodies within the blackbody temperature range of from about 2000° F. to about 2750° F. comprising:

a silicon photovoltaic cell, said cell having an output which changes with change in ambient temperature, a radiant energy filter having a substantially zero ambient temperature coefficient, and means for supporting said silicon photovoltaic cell and said filter to receive radiant energy from a hot body with said filter disposed in the optical path between the hot body and said silicon photovoltaic cell, said filter having the characteristic of high transmission of radiant energy up to about 0.55 micron with substantially zero transmission at about 0.95 micron and having the characteristic of making the output from said silicon photovoltaic cell substantially independent of changes in ambient temperature up to about 100° F. above ambient.

4. In combination, a photovoltaic cell having an output which changes in magnitude both with change in temperature of the hot body to be measured and with change in ambient temperature as a result of a change in the wavelength cutoff of said cell with change in ambient temperature, and means having the dual function of limiting the response of said cell to a narrow spectral passband and rendering the output of said cell in said combination substantially independent of ambient temperature changes, comprising filtering means having a substantially zero ambient temperature coefficient, said filtering means having the characteristic of cutting off radiant energy to said cell in the spectral region above a wavelength of about 0.95 micron to provide said combination with a passband having an effective wavelength of about 0.65 micron.

5. A radiation pyrometer for measuring the temperature of hot bodies comprising:

a radiant energy sensing element having an output which changes in magnitude with change in its ambient temperature as a result of a change in the wavelength cutoff of the sensing element with change in ambient temperature, and radiant energy filtering means having a substantially zero ambient temperature coefficient, said filtering means having the characteristic of limiting the spectral distribution of the radiant energy received by said sensing element to wavelengths up to about the wavelength of maximum response of said sensing element at its normal operating temperature thereby cutting off radiant energy to said sensing element in the spectral region where change in the wavelength cutoff of said sensing element takes place due to an increase in the operating temperature of said sensing element with an increase in its ambient temperature so that the output of said sensing element and therefore the output of said radiant pyrometer is rendered substantially independent of ambient temperature changes.

References Cited

UNITED STATES PATENTS

| | | |
|---|---|---|
| 2,051,320 | 8/1936 | States. |
| 2,982,856 | 5/1961 | Comp. |
| 3,025,763 | 3/1962 | Schwartz et al. |
| 3,149,968 | 9/1964 | Stephens. |
| 3,076,861 | 2/1963 | Samulon et al. ____ 250—212 X |

OTHER REFERENCES

Barber et al.: Temperature, Its Measurement and Control in Science and Industry, vol. III, pp. 391–403, 1962, Reinhold Pub. Corp.

Lovejoy: Temperature, Its Measurement and Control in Science and Industry, vol. III, pp. 487–506, Part I, 1962, Reinhold Pub. Co.

Gibson: Spectrophotometry, National Bureau of Standards, circular 484, Sept. 15, 1949, pp. 38, 39, Sect. 4.

WALTER STOLWEIN, *Primary Examiner.*

U.S. Cl. X.R.

250—83.3; 356—43